United States Patent
Yoshino

(10) Patent No.: US 7,219,699 B2
(45) Date of Patent: May 22, 2007

(54) RESIN-COATED STEEL PIPE EXCELLENT IN MECHANICAL STRENGTH SUCH AS SLIDING PROPERTY

(75) Inventor: Shuji Yoshino, Shizuoka (JP)

(73) Assignee: Yazaki Industrial Chemical Co., Ltd., Shizuoka (JP)

( * ) Notice: Subject to any disclaimer, the term of this patent is extended or adjusted under 35 U.S.C. 154(b) by 58 days.

(21) Appl. No.: 10/517,271

(22) PCT Filed: May 22, 2003

(86) PCT No.: PCT/JP03/06397

§ 371 (c)(1),
(2), (4) Date: Dec. 8, 2004

(87) PCT Pub. No.: WO03/103951

PCT Pub. Date: Dec. 18, 2003

(65) Prior Publication Data

US 2006/0162800 A1    Jul. 27, 2006

(30) Foreign Application Priority Data

Jun. 11, 2002    (JP)    ............................. 2002-170143

(51) Int. Cl.
*F16L 11/00*    (2006.01)
(52) U.S. Cl. ...................... 138/121; 138/143; 138/146; 428/36.91
(58) Field of Classification Search ................ 138/121, 138/143, 146, 106; 428/36.91
See application file for complete search history.

(56) References Cited

U.S. PATENT DOCUMENTS

| | | | | |
|---|---|---|---|---|
| 2,968,321 A | * | 1/1961 | Kahn | .......................... 138/122 |
| 3,439,586 A | * | 4/1969 | Holtan et al. | ............... 92/169.1 |
| 4,839,204 A | * | 6/1989 | Yoshino et al. | ............. 428/35.8 |
| 5,373,046 A | * | 12/1994 | Okamura et al. | ........... 524/413 |
| 5,437,311 A | * | 8/1995 | Reynolds | ..................... 138/115 |
| 5,601,893 A | * | 2/1997 | Strassel et al. | ............. 428/35.9 |
| 5,902,656 A | * | 5/1999 | Hwang | .................... 428/36.91 |
| 5,993,924 A | * | 11/1999 | Deroch et al. | ............ 428/36.91 |
| 6,040,025 A | * | 3/2000 | Lorek | .......................... 428/35.9 |
| 6,631,741 B2 | * | 10/2003 | Katayama et al. | ........... 138/121 |
| 6,659,135 B2 | * | 12/2003 | Sorkin | ......................... 138/121 |
| 6,706,350 B2 | * | 3/2004 | Sato et al. | .................. 428/36.9 |
| 7,069,954 B2 | * | 7/2006 | Takagi et al. | ................ 138/121 |
| 2005/0031894 A1 | * | 2/2005 | Klos et al. | ................... 428/659 |

FOREIGN PATENT DOCUMENTS

| | | |
|---|---|---|
| JP | 54-9339 | 1/1979 |
| JP | 2-114214 | 9/1990 |
| JP | 8-108136 | 4/1996 |

* cited by examiner

*Primary Examiner*—James Hook
(74) *Attorney, Agent, or Firm*—Morgan & Finnegan, LLP

(57) ABSTRACT

A resin-coated steel pipe is provided having excellent mechanical strength and sliding properties. A double coated structure is formed that extends in the pipe's axial direction and has substantially the same cross section. The structure has a thin steel pipe. Attached to the outer surface thereof is a coating layer with adhesive and an alloy resin. That alloy resin is a mixture of a styrenic resin and a crystalline engineering plastic. Further, formed on the outer surface of the alloy resin in a thickness required for mechanical strength and sliding properties is a crystalline engineering plastic. The resin-coated steel pipe exhibits markedly improved adhesion of the crystalline engineering plastic to the thin steel pipe and thus is free from a fear of the exfoliation of the plastic.

2 Claims, 6 Drawing Sheets

(A)
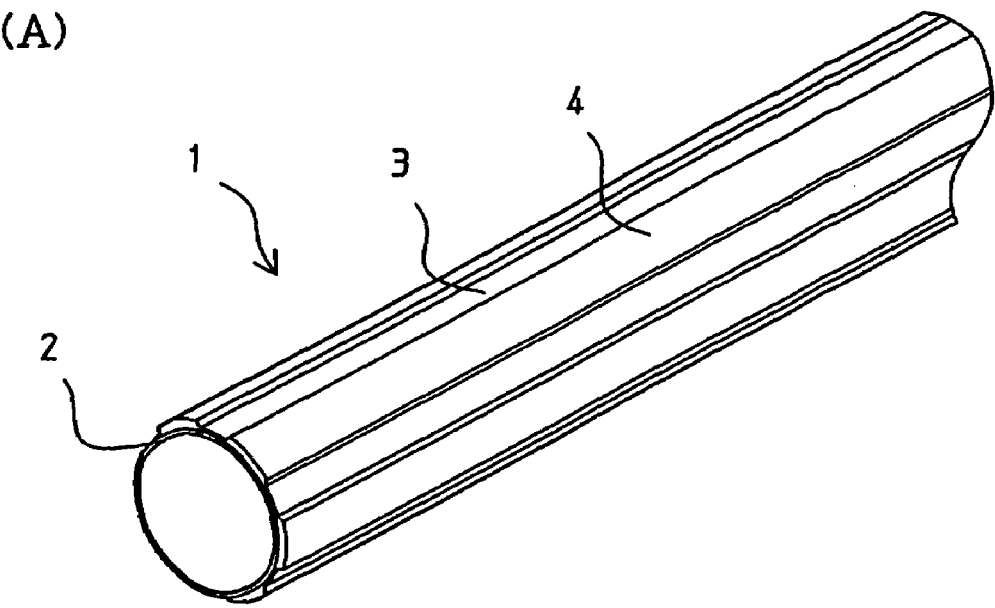
(B)
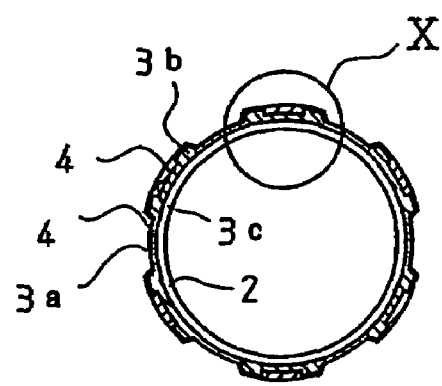
(C)
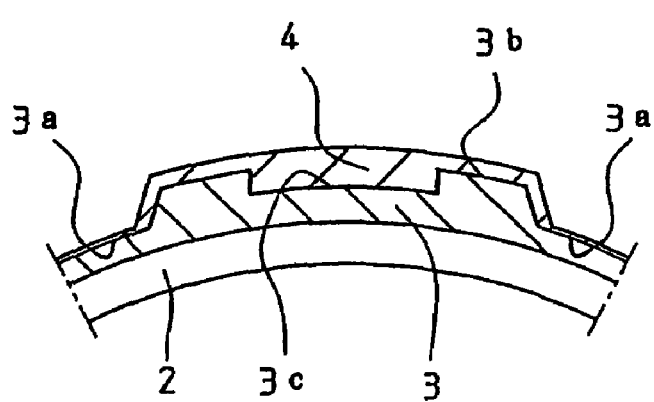
F I G. 1

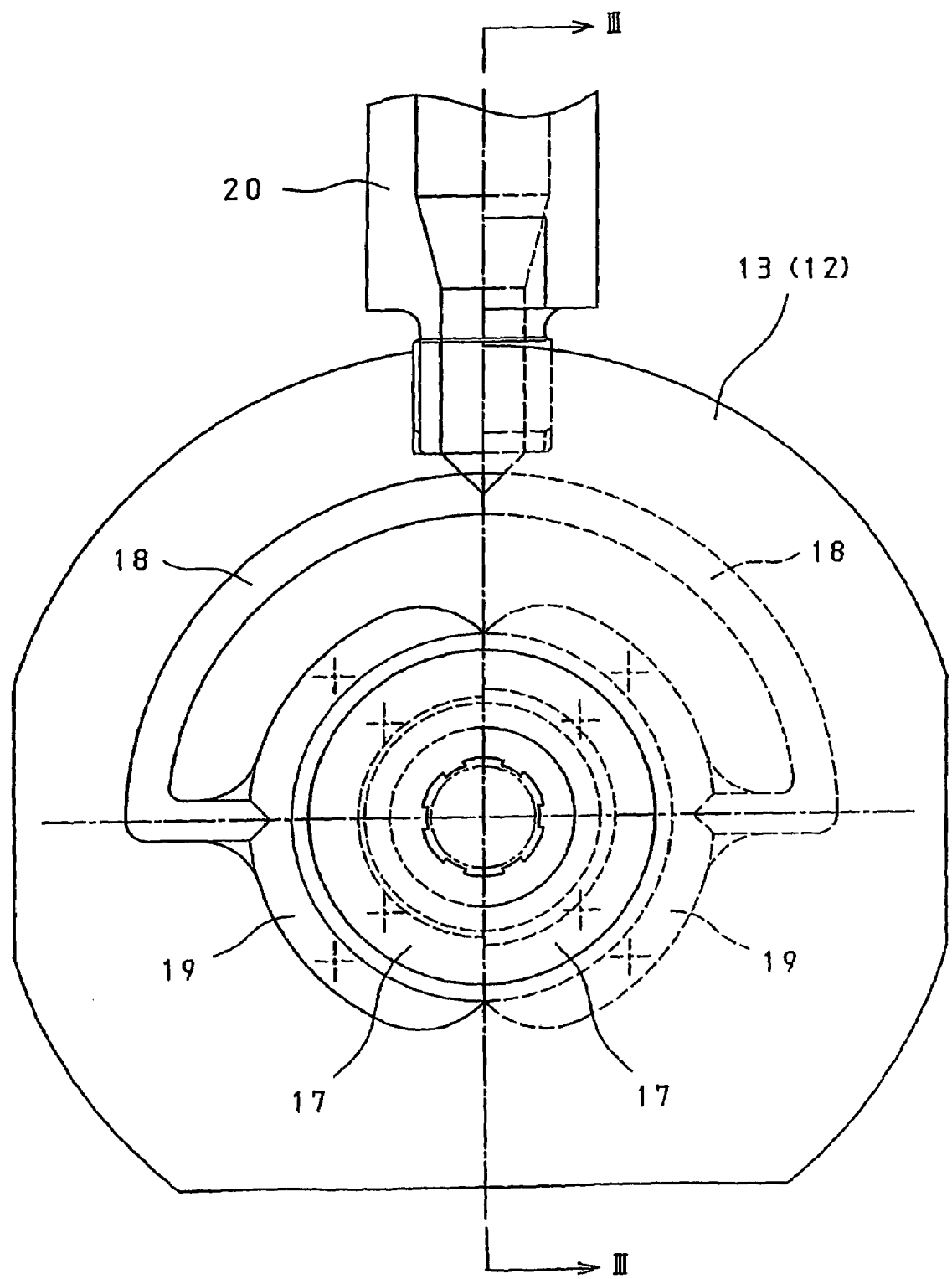
F I G. 2

(A)
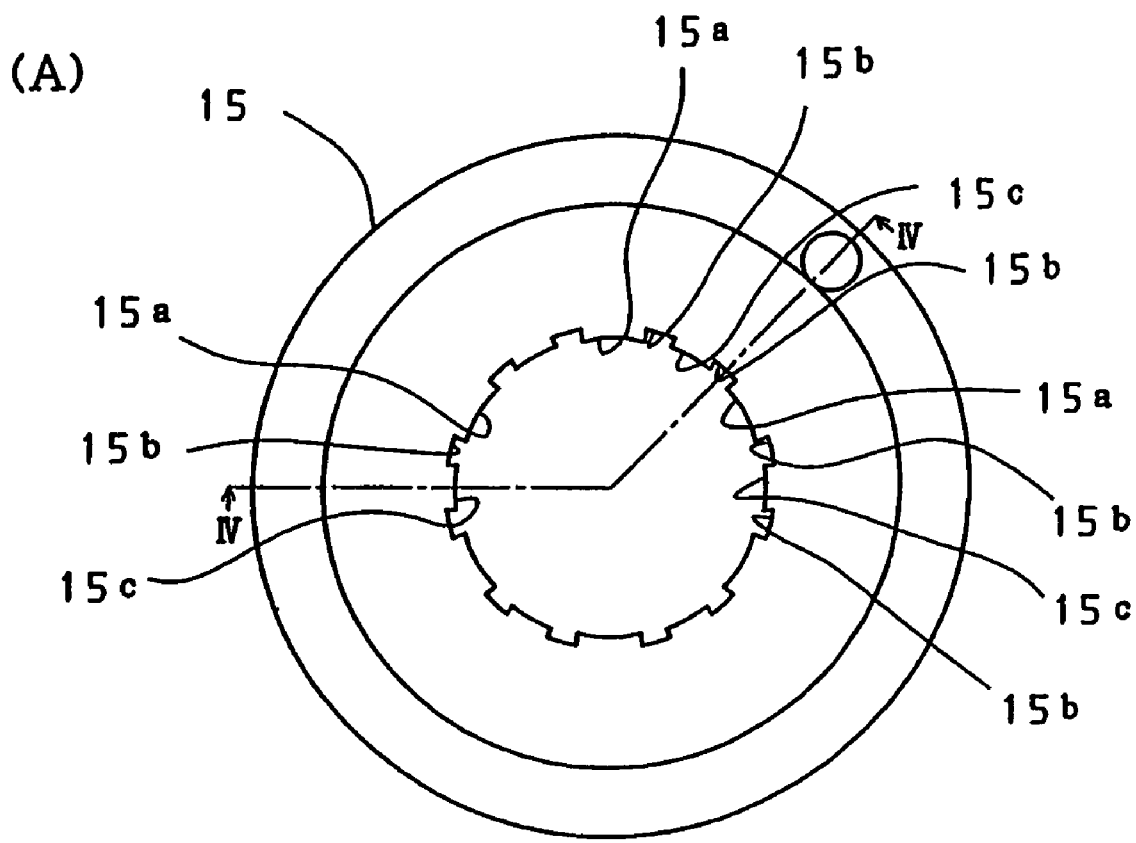
(B)
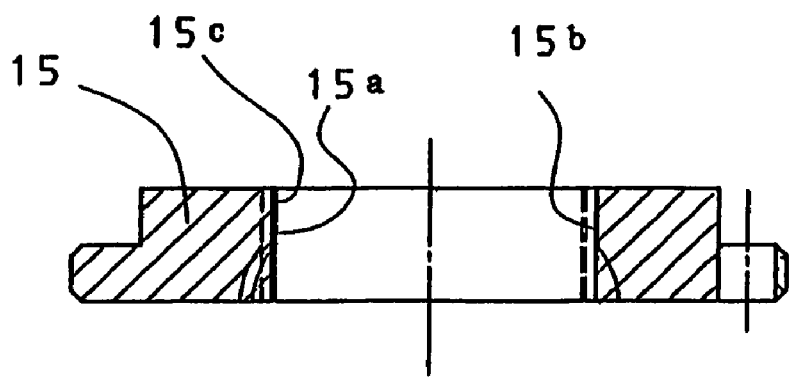
F I G. 4

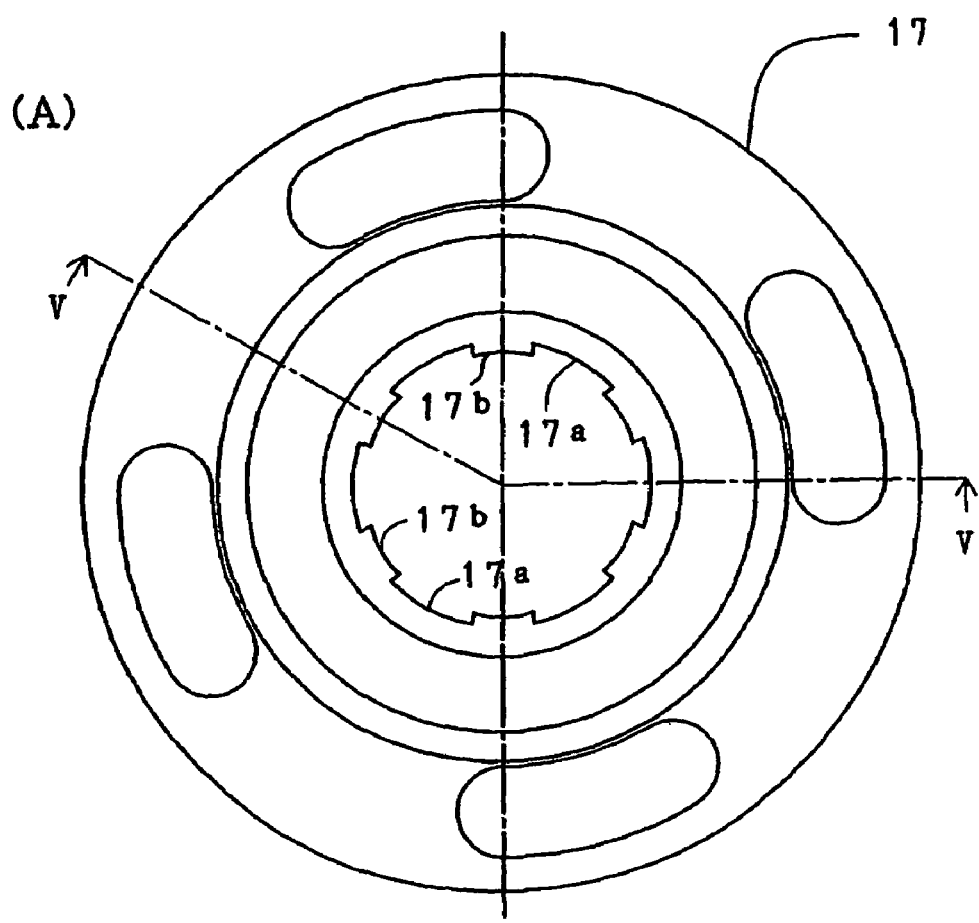
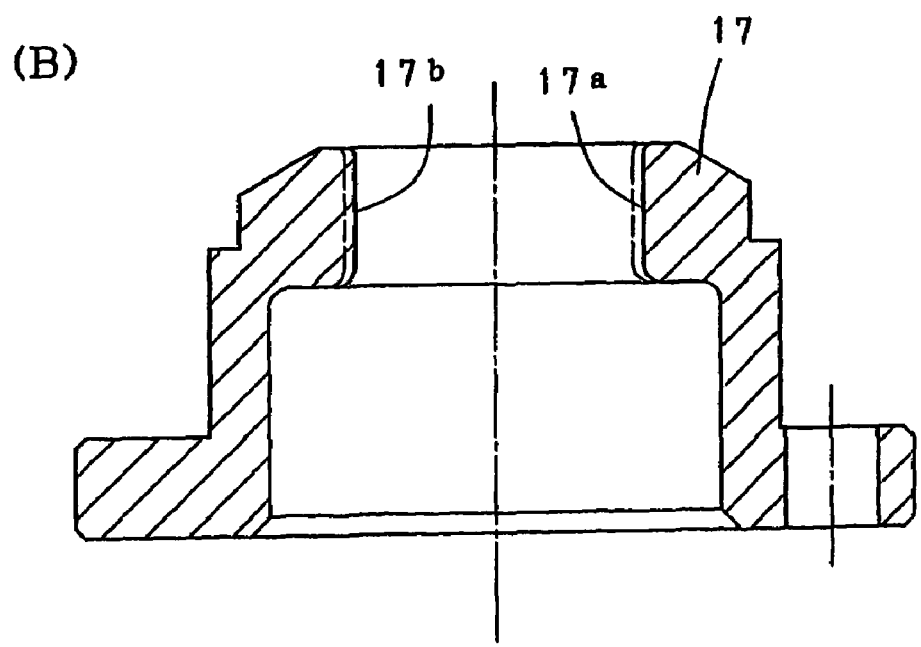
F I G. 5

RESIN-COATED STEEL PIPE EXCELLENT IN MECHANICAL STRENGTH SUCH AS SLIDING PROPERTY

BACKGROUND OF THE INVENTION

This invention belongs to the technical field of resin-coated steel pipe with superior mechanical strength, including the ability to slide, which uses, as its outer coating resin, a crystalline engineering plastic notably superior in mechanical strength, including the ability to slide, and in heat resistance. More particularly, the invention relates to a resin-coated steel pipe with superior mechanical strength, including the ability to slide, the crystalline engineering plastic of which greatly improves the adhesiveness of the steel pipe, making the pipe suited for use as a spline shaft used in live-roller conveyors for light or medium loads, and the like.

Crystalline engineering plastics such as PBT (polybutylene terephthalate) resin and nylon resin are notably superior in mechanical strength, including the ability to slide, and in heat resistance. Thus, if such plastics can be used as the outer coating resin of resin-coated steel pipes, then it is possible to obtain resin-coated steel pipes superior in their ability to slide, as well as in their durability. Accordingly, there are remarkable advantages to such steel pipes, and it is expected that there will also be great demand for the same. Resin-coated steel pipes are most suitable for use as members requiring a significant ability to slide, such as spline shafts used in live-roller conveyors for light or medium loads.

When using a crystalline engineering plastic as the outer coating resin of a resin-coated steel pipe, there has hitherto been no suitable adhesive that was able to satisfactorily bond the crystalline engineering plastic to a thin-walled steel pipe. The only available measure was to coat the thin-walled steel pipe with a thin film of a modified polyolefin-based adherent polymer and then bond the crystalline engineering plastic to the surface of the polymer.

However, the resin-coated steel pipe constructed by bonding a crystalline engineering plastic to the thin-walled steel pipe with an adherent polymer is problematic in that water is liable to seep into the interface between the thin-walled steel pipe and the adherent polymer, causing the separation of the coated resin (crystalline engineering plastic). Especially in cases where the resin-coated steel pipe is used outdoors, or in the field of agriculture or fisheries, regular contact with water will result in accelerated separation of the coated resin, thus impairing the practicality of the resin-coated steel pipe for such applications.

Also, although crystalline engineering plastics are superior in mechanical strength, including the ability to slide, as well as in heat resistance, they have a low melt viscosity and a large shrinkage factor. Consequently, a disadvantage also arises in that shaping stability, and thus dimensional accuracy, is low, lowering production efficiency.

Moreover, crystalline engineering plastics are in themselves expensive and are not economical materials. In the present circumstances, therefore, crystalline engineering plastics should be coated to the smallest possible thickness, thereby reducing the amount of the expensive resins used.

As stated above, it is extremely difficult to use a crystalline engineering plastic as the outer coating resin of a resin-coated steel pipe, and no such resin-coated steel pipe has been put to practical use yet.

Currently, therefore, the outer resin coating of resin-coated steel pipes is formed using synthetic resins, such as acrylate acrylic styrene (AAS), acrylonitrile-butadiene-styrene (ABS), Acrylonitrile-ethylene-styrene (AES) and Poly(ethylene terephthalate) glycol (PETG), which are inferior to crystalline engineering plastics in mechanical strength, including the ability to slide, and in heat resistance, but permit the use of a rubber-based adhesive which ensures excellent water resistance of the adhesion interface between the thin-walled steel pipe and the coated resin, and does not entail the separation of the coated resin.

A first object of the present invention is to provide a resin-coated steel pipe with superior mechanical strength, including the ability to slide, in which crystalline engineering plastic has greatly improved adhesiveness with respect to a thin-walled steel pipe, and thus is free from problems of separation.

A second object of the present invention is to provide a resin-coated steel pipe with superior mechanical strength including slidability, which can be more economically manufactured with improved production efficiency.

BRIEF SUMMARY OF THE INVENTION

To achieve the objects described above, the invention as recited in claim 1 relates to a resin-coated steel pipe with superior mechanical strength, including the ability to slide, in which an alloy resin that is a mixture of a styrene-based resin and a crystalline engineering plastic is coated over the outer peripheral surface of a thin-walled steel pipe and is bonded to it by an adhesive. The crystalline engineering plastic, of a thickness necessary to exhibit required mechanical strength, including the ability to slide, is coated over the outer peripheral surface of the coated resin such that the resin-coated steel pipe has a double coated structure with a uniform cross-sectional form along its axial direction.

In the resin-coated steel pipe with superior mechanical strength, including the ability to slide, according to claim 1, the invention recited in claim 2 is characterized in that the styrene-based resin is a resin selected from the group comprised of AAS resins, ABS resins and ABS resins, and the crystalline engineering plastic is a resin selected from the group comprised of PBT resins, nylon resins and polyacetal resins.

In the resin-coated steel pipe with superior mechanical strength, including the ability to slide, according to claim 1 or 2, the invention recited in claim 3 is characterized in that the thin-walled steel pipe is circular in section. The alloy resin bonded and coated over the outer peripheral surface of the thin-walled steel pipe has furrows and ridges formed alternately in the circumferential direction of the thin-walled steel pipe. Further, the furrows and the ridges extend in the axial direction of the thin-walled steel pipe such that the thin-walled steel pipe with the alloy resin coating has a uniform cross-sectional form along its axial direction. Each of the ridges has a groove formed on its outer peripheral surface and extending in the axial direction of the thin-walled steel pipe. The groove is capable of accommodating the crystalline engineering plastic of a thickness and width necessary to exhibit the required mechanical strength, including the ability to slide. The crystalline engineering plastic coated over the outer peripheral surface of the alloy resin has a thickness such that the crystalline engineering plastic coated over the grooves in the respective ridges of the alloy resin has a thickness greater than that coated on other regions, and that the resin-coated steel pipe is spline-shaped as a whole.

BRIEF DESCRIPTION OF THE DRAWINGS

FIG. 1A is a perspective view showing a resin-coated steel pipe with superior mechanical strength, including the ability to slide, according to the present invention, FIG. 1B is a sectional view of the resin-coated steel pipe, and FIG. 1C is an enlarged view of part X shown in FIG. 1B;

FIG. 2 is an elevation showing a principal part of a crosshead die-type extrusion molding machine;

FIG. 4A is a front view of an inner resin coating die ring, and FIG. 4B is a sectional view taken along line IV—IV;

FIG. 5A is a front view of an outer resin coating die ring, and FIG. 5B is a sectional view taken along line V—V.

DETAILED DESCRIPTION OF THE INVENTION

Figure 3:
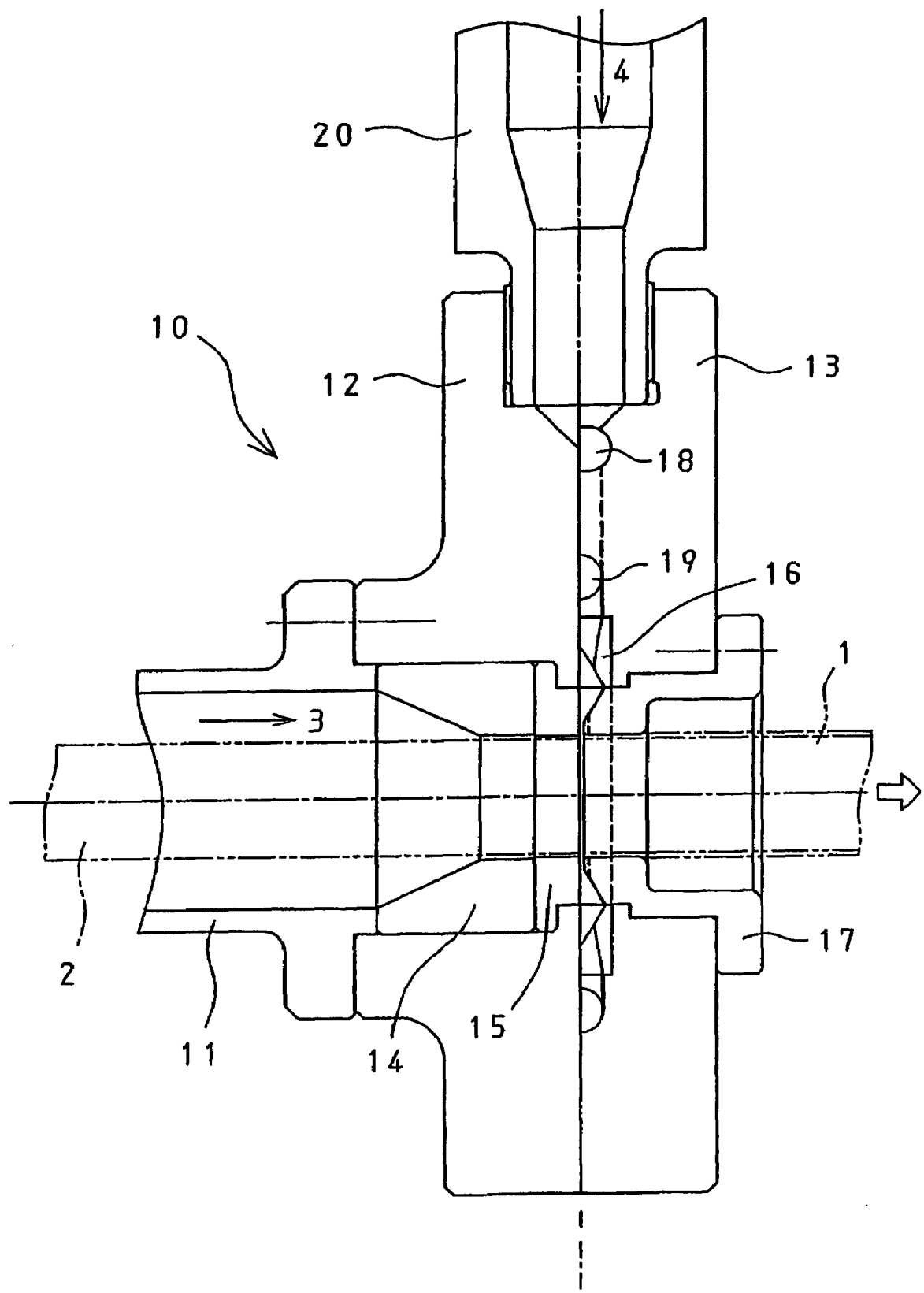
FIG. 3 is a sectional view taken along line III—III in FIG. 2.
Figure 6:
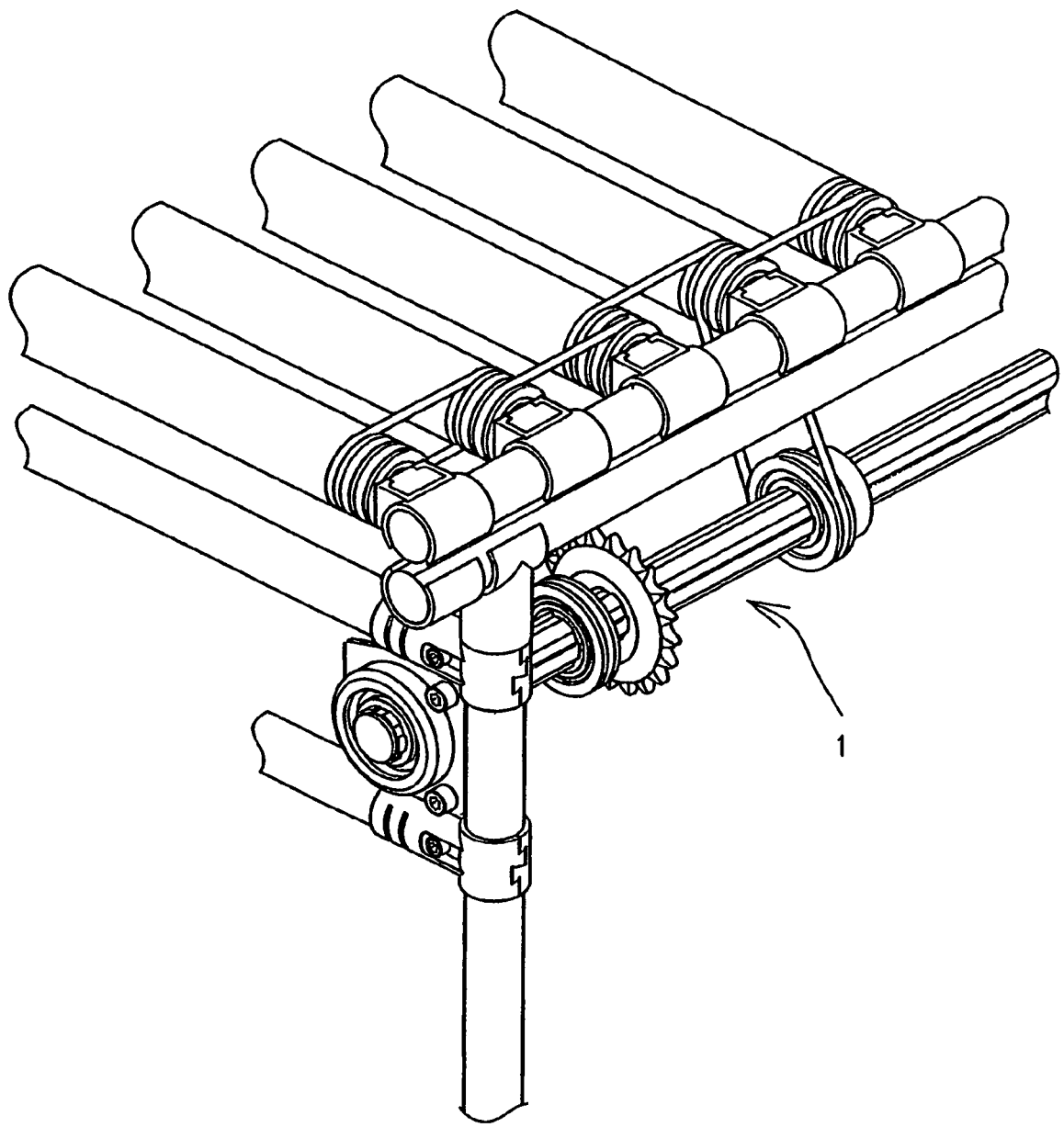
FIG. 6 is a reference figure showing an example of how the resin-coated steel pipe with superior mechanical strength, including the ability to slide, according to the present invention may be used.

FIGS. 1A to 1C illustrate a resin-coated steel pipe 1 with superior mechanical strength, including the ability to slide, according to an embodiment of the invention as recited in claim 1. The resin-coated steel pipe 1 with superior mechanical strength, including the ability to slide, is suitable for use as a spline shaft, for example, which is used in a live-roller conveyor for light or medium loads, etc., and which is required to have a significant ability to slide.

The alloying of resins has conventionally been carried out in order to obtain superior functions and properties that cannot be achieved by a single resin. Recently, alloy resins containing resins with originally poor compatibility, alloyed using a compatibilizer, have become commercially available, and styrene-based resins alloyed with various resins have also appeared in the market. The present invention is based on the following technical concepts: An alloy resin 3, which is a mixture of a styrene-based resin and a crystalline engineering plastic, is used so that a rubber-based adhesive capable of adhering to the styrene-based resin contained in the alloy resin 3 ensures sufficiently high adhesion to the surface of a steel pipe 2 while at the same time the alloy resin can be coated externally with the crystalline engineering plastic 4 and bonded by means of its compatibility with the crystalline engineering plastic 4. Thus, the resin-coated steel pipe 1 is greatly improved in terms of adhesiveness of the crystalline engineering plastic 4 to the thin-walled steel pipe 2. Also, the required mechanical strength, including the ability to slide, is efficiently attained while minimizing the amount of the expensive crystalline engineering plastic 4 used.

In the resin-coated steel pipe 1, a rubber-based adhesive is applied to the outer peripheral surface of the thin-walled steel pipe 2 which is circular in section and has an outside diameter of about 26 mm, and the alloy resin 3 is coated on and bonded to the outer peripheral surface of the steel pipe 2 applied with the adhesive. The alloy resin 3 is composed of an AAS resin, which is a styrene-based resin, and a PBT resin, which belongs to crystalline engineering plastics.

The outer peripheral surface of the alloy resin 3 is coated with the same crystalline engineering plastic as that constituting the alloy resin 3, that is, the PBT resin 4, which has a thickness necessary to exhibit the required mechanical strength, including the ability to slide, such that the resin-coated steel pipe has a double coated structure with a uniform cross-sectional form along its axial direction, (according to claim 1 of the present invention).

The alloy resin 3 is a polymer alloy of AAS resin containing 20% PBT resin. The alloy resin is coated over the outer peripheral surface of the thin-walled steel pipe 2 and has furrows 3a and ridges 3b formed alternately in the circumferential direction of the thin-walled steel pipe. The furrows 3a and the ridges 3b extend in the axial direction of the thin-walled steel pipe such that the thin-walled steel pipe coated with the alloy resin has a uniform cross-sectional form along its axial direction. The ridges 3b, which are six in number, each has a groove 3c formed on the outer peripheral surface and extending in the axial direction of the thin-walled steel pipe, the groove 3c being capable of accommodating the PBT resin 4 for a thickness (about 0.5 mm) and width (about 4 mm) necessary to exhibit the required mechanical strength, including the ability to slide.

The PBT resin 4 is coated over the outer peripheral surface of the alloy resin 3 such that the PBT resin has a greater thickness (about 0.8 mm) in regions corresponding to the grooves 3c in the ridges 3b of the alloy resin 3, has a lesser thickness (about 0.3 mm) in regions corresponding to the other regions of the ridges 3b, and has the least thickness (about 0.1 mm) in regions corresponding to the furrows 3a, (according to claim 3 of the present invention).

The styrene-based resin constituting the alloy resin 3 is not limited to the AAS resins alone, and ABS resin or AES resins may be used instead. Also, the crystalline engineering plastic 4 to be used is not limited to PBT resins 4; nylon resin or polyacetal resins may also be used, (according to claim 2 of the current invention). Namely, a resin-coated steel pipe coated with a desired crystalline engineering plastic can be obtained insofar as a styrene-based alloy resin containing the desired crystalline engineering plastic is available.

In this embodiment, six ridges 3b are arranged at substantially equal intervals in the circumferential direction of the steel pipe, but the number of the ridges is not limited to six. Also, the resin-coated steel pipe 1 of the embodiment is shaped like a spline (spline shaft), but the shape of the steel pipe is, of course, not limited to spline and may be cylindrical.

The PBT resin 4 has an increased thickness in the region corresponding to the central portion of each ridge 3b, as viewed in cross section, in order to efficiently impart the required mechanical strength, including the ability to slide, to the steel pipe, while at the same time minimizing the amount of the expensive crystalline engineering plastic 4 used. Also, in the event the resin-coated steel pipe 1 of the embodiment is used as a spline shaft, the central portions of the ridges 3b, which are fitted into a bearing, are most likely to wear away due to sliding contact, and this is why the thickness of the PBT resin is increased. The grooves 3c of the alloy resin 3, which permit the thickness of the PBT resin 4 to be increased, also serve to restrict the extruded PBT resin 4 with the opposing walls of each groove, and the ridges and the furrows can be formed stably even though the PBT resin 4, which has a low melt viscosity and is difficult to keep in shape, is used.

Specifically, in the example shown in FIG. 1, the thin-walled steel pipe 2 used has a thickness of about 1 mm or less and an outside diameter of about 26 mm. The alloy resin 3 is about 0.5 mm thick at the furrow 3a and about 1.2 mm thick at the ridge 3b. Each groove 3c is about 4 mm wide and about 0.5 mm deep. The PBT resin 4 has an increased thickness of about 0.8 mm in the region corresponding to the groove 3c, has a lesser thickness of about 0.3 mm in the region corresponding to the ridge 3b excepting the groove 3c, and has the least thickness of about 0.1 mm in the region corresponding to the furrow 3a. Accordingly, the resin-coated steel pipe 1 as a whole, which is spline-shaped and is formed by extrusion molding, has a major outside diameter of about 29 mm when measured at the ridges 3b, and a minor outside diameter of about 27.2 mm when measured at the furrows 3a.

The aforementioned resin-coated steel pipe 1 with superior mechanical strength, including the ability to slide, has the following advantages: (1) The PBT resin (crystalline engineering plastic) 4 is coated on the thin-walled steel pipe 2 such that the alloy resin 3 with compatibility to the PBT resin is interposed between the steel pipe 2 and the PBT resin. Accordingly, the PBT resin 4 has sufficiently high adhesion to the thin-walled steel pipe 2, thus eliminating the possibility of the coated PBT resin being separated. (2) The PBT resin 4, which has a low melt viscosity and is difficult to keep in shape, is extruded while being restricted by the opposing walls of each groove 3c of the alloy resin 3, allowing the shaping to be stabilized and production efficiency to be greatly improved. (3) The use of the expensive crystalline engineering plastic 4 is limited to the minimum amount necessary to ensure the required ability to slide, so that the resin-coated steel pipe can be manufactured economically at a low unit cost.

Referring now to FIG. 2 and the succeeding drawings, an extrusion molding method for producing the resin-coated steel pipe 1 with superior mechanical strength, including the ability to slide according to the embodiment is described.

FIGS. 2 and 3 illustrate a crosshead die-type extrusion molding machine used in the extrusion molding method. In FIG. 3, reference numeral 10 denotes the die ring structure of the cross die, which constitutes a principal part of the extrusion molding machine. The basic structure of the machine is almost identical with that of the extrusion molding machine described in Japanese Patent No. 2867244 granted to this applicant.

In the extrusion molding machine, the distribution piece 14 and the inner resin coating die ring 15, which are arranged adjacent to the adapter 11 attached to the distal end of the cross die, not shown, are fixed in position by a distribution plate 12, and the radial distribution piece 16 and the outer resin coating die ring 17 are fixed in position by a distribution plate 13. The distribution plates 12 and 13 are in close contact with, and securely fixed to, each other. A coupling member 20, which is coupled to a heating cylinder, is connected to upper portions of the distribution plates 12 and 13 across the plane where the distribution plates are joined. The alloy resin 3 from the cross die is coated over the outer peripheral surface of the thin-walled steel pipe 2 by the inner resin coating die ring 15. Subsequently, the PBT resin 4 from the heating cylinder is coated over the outer peripheral surface of the alloy resin 3 by the outer resin coating die ring 17.

A flow passage for introducing the PBT resin (crystalline engineering plastic) 4 from the coupling member 20 to the outer resin coating die ring 17 is constituted by a relatively large semicircular first flow passage 18 concentric with the thin-walled steel pipe 2, and small-diameter second flow passages 19, 19 located inside the first flow passage and connected to respective opposite ends of the semicircular first flow passage. The second flow passages 19, 19 are connected to each other and their junctions are narrowed so that the resin may be uniformly extruded toward the center.

The second flow passages 19, 19 connect with through-holes 17a and 17b (see FIG. 5) in the outer resin coating die ring 17 through radial flow passages formed in the radial distribution piece 16.

As shown in FIGS. 4A and 4B, the inner resin coating die ring 15 has through-holes 15a, 15b and 15c. The through-hole 15a corresponds to the furrows 3a of the alloy resin 3 to be coated, and the through-hole 15c corresponds to the grooves 3c of the alloy resin 3. Each of the through-holes 15c and the through-holes 15b corresponds to a ridge 3b of the alloy resin 3.

As shown in FIGS. 5A and 5B, to coat the alloy resin 3 with the PBT resin 4, the outer resin coating die ring 17 has through-holes 17a, each of which has a circumferential width corresponding to one through-hole 15c of the inner resin coating die ring 15 and the through-holes 15b, 15b located on either side, so as to coat the PBT resin 4 with an increased thickness, and the through-holes 17b each corresponding in position to through-hole 15a so as to coat the PBT resin 4 with a lesser thickness.

To obtain the resin-coated steel pipe 1 with superior mechanical strength, including the ability to slide, by extrusion molding with the use of the aforementioned molding machine, first, the thin-walled steel pipe 2 is advanced into the cross die, not shown, to the right, and as the steel pipe 2 advances, the alloy resin 3, which is supplied to the inner resin coating die ring 15 via the adapter 11 and the distribution piece 14, is coated on and bonded to the steel pipe 2.

Subsequently, the thin-walled steel pipe 2 reaches the outer resin coating die ring 17, where the PBT resin 4, which is supplied to the through-holes 17a and 17b from the coupling member 20 through the first and second flow passages 18 and 19, the radial distribution piece 16 and the gap between the inner and outer resin coating die rings 15 and 17, is coated over the outer peripheral surface of the alloy resin 3 while being kept in shape by the alloy resin. In this manner, the resin-coated steel pipe 1 including the alloy resin 3 and the PBT resin 4 as its inner and outer coatings, respectively, as shown in FIG. 1, is obtained by extrusion molding, and the steel pipe 1 thus obtained is spline-shaped and has a double coated structure with a uniform cross-sectional form along the axial direction thereof.

While the embodiment of the present invention has been described with reference to the drawings, it is to be noted that the invention is not limited to the construction of the embodiment shown and described, and that variations in design and applications that will readily occur to those skilled in the art without departing from the technical concepts of the invention should be regarded as falling within the scope of the invention.

In the resin-coated steel pipe with superior mechanical strength, including the ability to slide, according to the present invention, the crystalline engineering plastic is coated in such a manner that the alloy resin, which is compatible with the engineering plastic, is interposed between the thin-walled steel pipe and the engineering plastic. Accordingly, the coated crystalline engineering plastic has sufficiently high adhesion to the steel pipe and does not separate from it. Also, the PBT resin, which has a low melt viscosity and is difficult to keep in shape, is extruded while being restricted by the opposing walls of each groove of the alloy resin, allowing the shaping to be stabilized and the production efficiency to be greatly improved. Further, the use of the expensive crystalline engineering plastic is limited to the amount necessary to ensure the required ability to slide, and therefore, the resin-coated steel pipe can be economically manufactured at a low unit cost.

The invention claimed is:

1. A resin-coated steel pipe with superior mechanical strength, including an ability to slide comprising:

an alloy resin which is a mixture of a styrene-based resin and a crystalline engineering plastic is coated over an outer peripheral surface of a thin-walled steel pipe and is bonded thereto by an adhesive, and said crystalline engineering plastic having a thickness necessary to exhibit a required mechanical strength, including said ability to slide, is coated over an outer peripheral surface of said coated alloy resin such that said resin-coated steel pipe has a double coated structure with a uniform cross-sectional form along an axial direction thereof, said thin-walled steel pipe is circular in section; and said alloy resin bonded and coated over said outer peripheral surface of said thin-walled steel pipe forms a plurality of furrows and ridges alternately in a circumferential direction of said thin-walled steel pipe, said furrows and said ridges extending in an axial direction of said thin-walled steel pipe such that said thin-walled steel pipe with said alloy resin coated thereon has a uniform cross-sectional form along an axial direction thereof, each of said ridges having a groove formed in an outer peripheral surface thereof and extending in said axial direction of said thin-walled steel pipe, said groove being capable of accommodating said crystalline engineering plastic with a thickness and width necessary to exhibit a required mechanical strength, including the ability to slide, and said crystalline engineering plastic coated over said outer peripheral surface of said alloy resin having a thickness such that said crystalline engineering plastic coated over said grooves in respective ridges of said alloy resin has a thickness greater than that coated on other regions, and forming a spline-shape in a uniform cross-section along an axial direction as a whole, said spline-shape is formed by furrows and ridges alternatively in a circumferential direction.

2. The resin-coated steel pipe with superior mechanical strength including slidability according to claim 1, wherein said styrene-based resin is a resin selected from a group consisting of AAS resins, ABS resins and ABS resins, and said crystalline engineering plastic is a resin selected from a group consisting of PBT resins, nylon resins and polyacetal resins.

* * * * *

UNITED STATES PATENT AND TRADEMARK OFFICE
CERTIFICATE OF CORRECTION

PATENT NO. : 7,219,699 B2  
APPLICATION NO. : 10/517271  
DATED : May 22, 2007  
INVENTOR(S) : Shuji Yoshino It is certified that error appears in the above-identified patent and that said Letters Patent is hereby corrected as shown below:

On the Title page at item (54):

Please delete "RESIN-COATED STEEL PIPE EXCELLENT IN MECHANICAL STRENGTH SUCH AS SLIDING PROPERTY" and insert --RESIN-COATED STEEL PIPE WITH SUPERIOR MECHANICAL STRENGTH, INCLUDING THE ABILITY TO SLIDE--.

At Column 2, line 41:

Please delete "ABS" (second instance) and insert --AES--.

At Column 8, line 19: Claim 1

Please delete "ABS" (second instance) and insert --AES--.

Signed and Sealed this

Seventeenth Day of July, 2007

JON W. DUDAS  
*Director of the United States Patent and Trademark Office*